Aug. 27, 1935.  G. H. FAHRENBRUCH  2,012,870
SAFETY SUPPORT FOR BRAKE RODS
Filed June 5, 1934
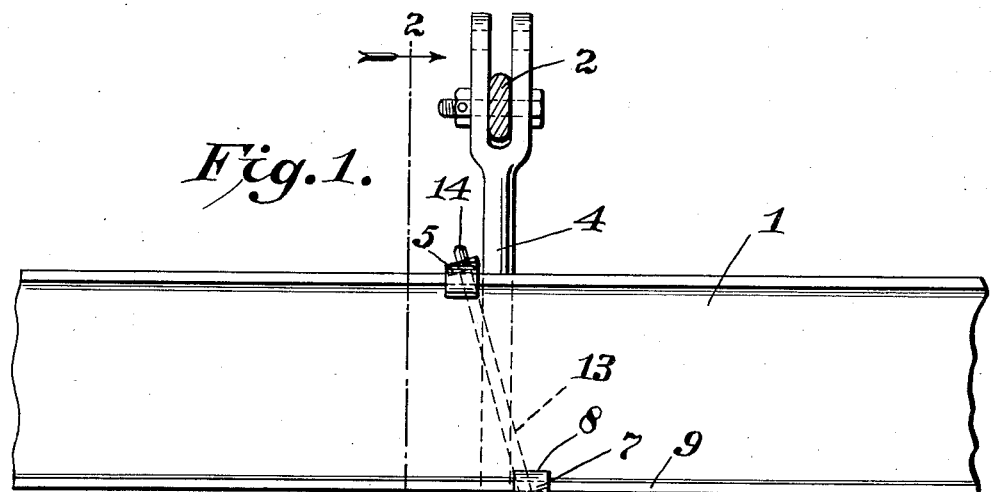
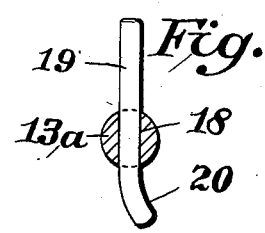
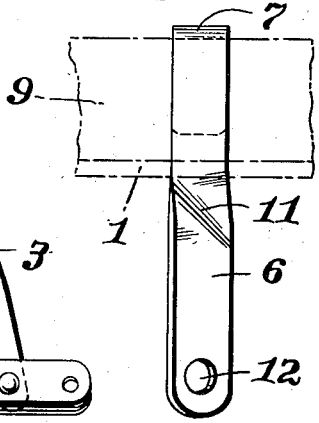
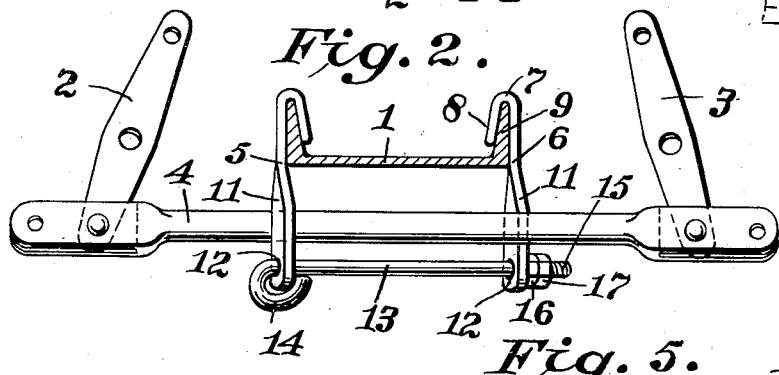
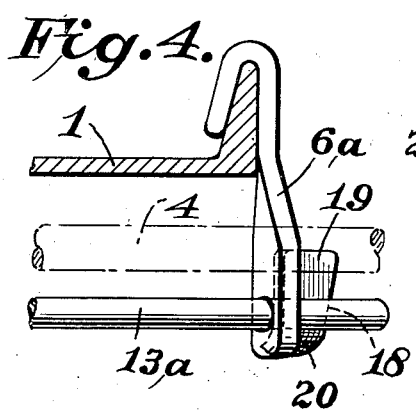
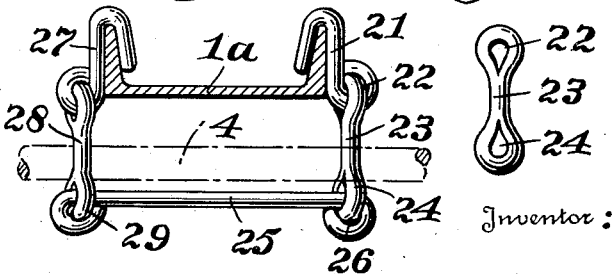
Inventor:
George H. Fahrenbruch,
By Parker Cook.
Attorney.

Patented Aug. 27, 1935

2,012,870

UNITED STATES PATENT OFFICE 2,012,870

SAFETY SUPPORT FOR BRAKE RODS

George H. Fahrenbruch, Sheridan, Wyo.

Application June 5, 1934, Serial No. 729,153

4 Claims. (Cl. 188—210)

My invention relates to new and useful improvements in safety supports for brake rods, that is, a support for what is known as the "bottom rod" which connects the two brake levers and brake mechanism of a car truck.

It frequently happens that either the brake rod becomes damaged or the pivots drop out between the bottom rod and the brake levers, allowing the rod or levers to fall upon the track and cause an accident to the train or otherwise damage the brake mechanism.

One of the important objects of the present invention, therefore, is to provide exceedingly simple means that will support the brake rod, that is, should it become damaged, and thus prevent the rod or other mechanisms from dropping down and coming into contact with the railroad ties when the car is in motion.

Another object of the invention is to provide a safety support that will be extremely cheap to manufacture and in its preferred form will be so constructed that the side arms of the device may be pulled up tightly to thus more rigidly clamp the support to the truck or more particularly to what is known as the "spring plank".

Still another object of the invention is to provide a safety support that may be easily forged or readily formed from strap iron or rod blanks to thus keep down the cost of manufacture.

Still another object of the invention is to provide a safety support that is readily and easily attached to the spring plank, there being no holes to be drilled or rivets to be driven, the support, in turn, being hung on the spring plank, while in the preferred form, the side arms of the support are capable of being adjusted to more tightly hold the support in position.

With these and other objects in view, the invention consists in certain new and novel arrangements and combination of parts, as will be hereinafter more fully described and pointed out in the claims.

Referring now to the drawing showing a preferred embodiment with several slight modifications, Fig. 1 is a plan view of a portion of the spring plank of a truck for freight cars and the brake rod in relation thereto, and showing the safety support for the brake rod;

Fig. 2 is a cross-sectional view on the line 2—2 of Fig. 1;

Fig. 3 is an enlarged detail view of one of the supporting arms or straps;

Fig. 4 is a fragmentary detail view of a slightly modified form for adjusting the clamping action of the supporting straps or arms against the flanges of the spring plank;

Fig. 4a is an enlarged detail section of Fig. 4;

Fig. 5 is a cross-sectional view similar to Fig. 2, showing a further modification of the supporting straps;

Fig. 5a is a detail of the link of Fig. 5.

Referring to the drawing, and for the moment to Fig. 1, there may be seen a fragmentary portion of a spring plank 1 of a car truck (not shown), the brake levers 2 and 3, and the brake rod 4, which connects the respective levers 2 and 3. Also in this view there may be seen the improved safety support which is here shown for the purpose of its location with regard to the spring plank 1 and the brake rod 4.

Referring now more particularly to the support, there may be seen in Fig. 2 the improved support, which consists primarily of what I term the "side arms" or "straps" 5 and 6, and a description of the one is a description of the other. It will be seen that the arm is then bent, as at 7, and downwardly, as at 8, to tightly hug the flange 9 of the spring plank 1. It will also be noticed that the arm 6 extends downwardly and is slightly twisted or turned, as at 11, and is provided near its lower end with an opening 12.

Extending between these two arms 5 and 6 may be seen the lower supporting rod 13, which preferably has the eye 14, while the other end of the rod is screw-threaded, as at 15, and will be passed through the opening 12, after which the maiden nut 16 will be threaded in position until the two arms 5 and 6 are forced tightly toward each other. After this, a lock nut 17 may be placed against the maiden nut to rigidly hold the parts in position.

As may be seen in Fig. 1, instead of clamping these two arms 5 and 6 directly opposite each other they are spaced slightly diagonally, so that the brake rod 4 in extending above the rod 13 of the support will pass along one edge of the arm 5 and the opposite edge of the arm 6. In this manner, the arms, even though loosely clamped on the spring plank, will be more or less prevented by the brake rod from shifting from their relative diagonal positions.

In Figs. 4 and 4a, I have shown the supporting rod 13a having a slot 18 formed therein (see Fig. 4a), and fitting within this slot is a wedge key 19 which, when driven in the slot, will tend to force the one arm 6a toward the other arm (not shown), as will be readily understood. The lower end of the wedge key, after being driven into place, may be bent slightly, as at 20, to prevent its working loose or becoming lost.

Thus, it will be seen that either a slot and a wedge-shaped key may be used, or the supporting rod may be threaded and nuts used to hold it in position. By twisting or offsetting the arms 5 and 6 at the points 11, it will be understood that these arms may be set in slight diagonal relationship and, at the same time, the lower ends of the arms with the openings therein, through which the lower rod passes, will be in parallel relationship.

From the above description, it will be seen that the safety support is one that may be attached and wherein the side arms or straps may be pulled toward each other, so that the support will be tightly gripped on the flanges of the spring plank. With a support of this kind, should the pins or bolts drop from the brake rod or brake levers and the rod tend to drop, the brake rod will be prevented from falling below the lower rod to thus keep the rod or levers from tearing into the ties and otherwise damage the brake mechanism.

Referring now to the slight modification in Fig. 5, there is fragmentarily shown the spring plank 1a, and in this instance, instead of having the rigid side arms, there is provided the hook 21 which has the eye 22 in which will be fitted a link 23. Through the bottom eye 24 of this link may be passed what I term the "lower rod" 25 which, in turn, will have an eye 26 fitting within the eye 24. Of course, there will be the oppositely disposed hook 27 with its link 28 and which will engage the eye 29 of the lower rod 25. In this form, there is no means shown for pulling the links 23 and 28 toward each other, but there is a flexibility in this support which makes it unnecessary to provide a separate locking means.

Although I have not illustrated it, in the same way the brake rod will pass to one side of one link and on the opposite side of the other link, similar to the preferred form, and thus the brake rod will prevent any shifting of the support.

In both instances, it will be seen that I have a lower rod that is supported by brackets that are, in turn, hung from the spring plank and which supports may be formed of commercial stock. Likewise, in this instance, no special holes have to be drilled or no rivets secured in the truck, so that the support may be readily attached or just as quickly detached.

Many slight changes are possible in the construction hereinbefore set forth without in any manner departing from the spirit of the invention.

I claim:

1. In a safety support for brake rods, in combination with a car truck having a spring plank, two strap arms having downturned upper ends to engage the flanges of the spring plank and the said strap arms disposed in diagonal relation to each other, a bar passing through both of said strap arms adapted to support the brake rod if the same should drop, and means on the said bar for forcing the lower ends of the strap arms toward each other to thereby more rigidly hold the strap arms on said spring plank.

2. In a safety support for brake rods and the like, two strap arms having their upper ends turned downwardly to form hooks adapted to engage the flanges of a spring plank, said arms being diagonally disposed and slightly twisted so that the lower ends of the arms are in parallel relation with each other, a bar extending between the two side arms, means on the bar for forcing the lower ends of the arms toward each other to thereby more rigidly hold the support on the spring plank.

3. A safety support for brake rods adapted to be hung from the spring plank of a truck including two side arms having downbent upper ends to form hooks, the side arms being twisted slightly midway their length and the said arms provided with openings in their lower ends to receive a bar, a cross-bar having an eye at one end fitting within the opening of one of said arms, and means on the other end of said bar for forcing the lower ends of the arms toward each other to thereby more rigidly clamp the supporting device on the spring plank.

4. In a safety support for brake rods and the like, two arms having their upper ends turned downwardly to form hooks to engage the flanges of a spring plank, said arms being disposed in diagonal relation to each other on said spring plank and the arms slightly twisted substantially midway their length and provided with openings in their lower ends, a cross-bar extending through said openings and one end of the bar being threaded to receive a nut whereby the lower ends of the arms may be pulled toward each other.

GEORGE H. FAHRENBRUCH